Figure 1:
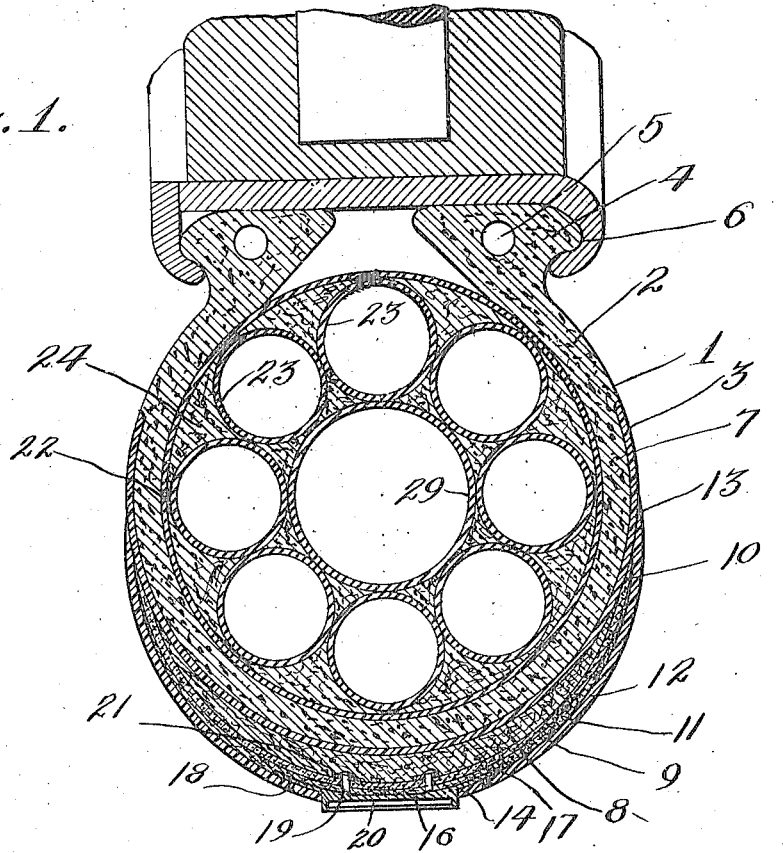

F. LODER.
RESILIENT PNEUMATIC TIRE.
APPLICATION FILED MAY 29, 1914.

1,153,396.

Patented Sept. 14, 1915.
2 SHEETS—SHEET 1.

Witnesses
Philip Tuell
Frances J. Boswell

Inventor
Frank Loder

By D. Swift &C.
his Attorneys

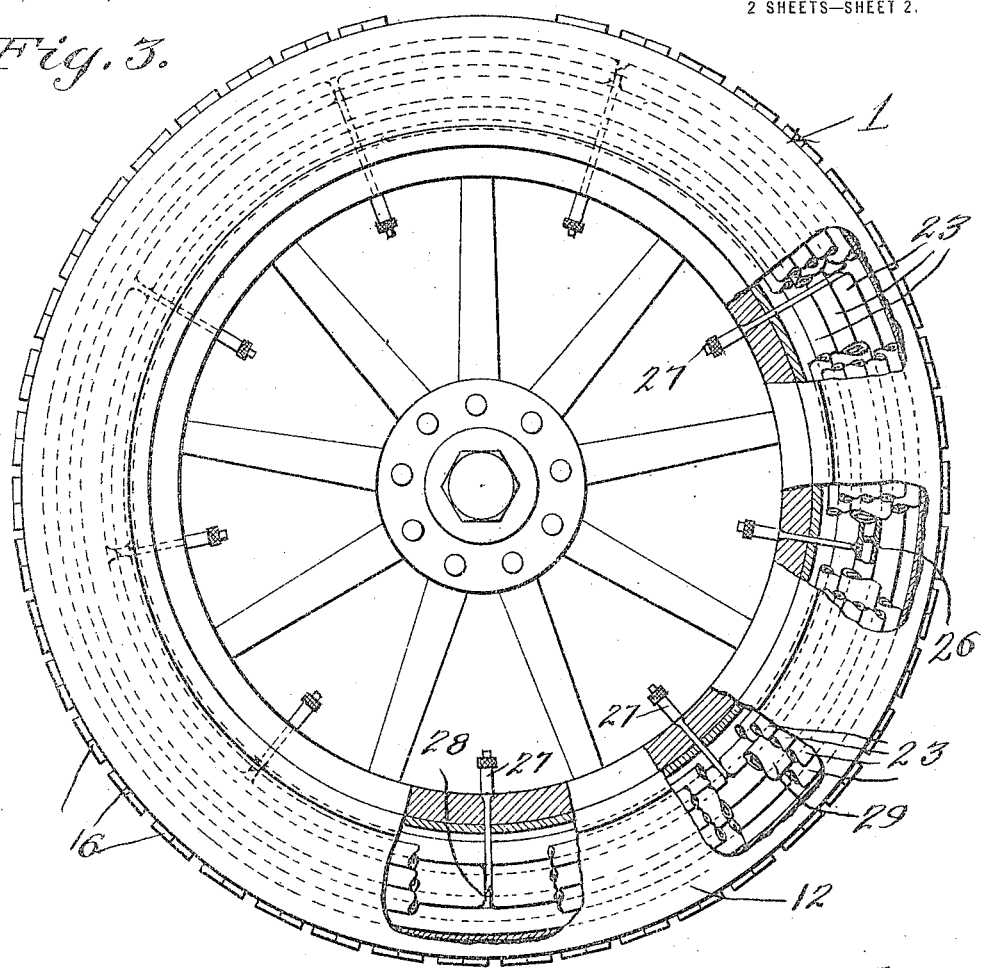
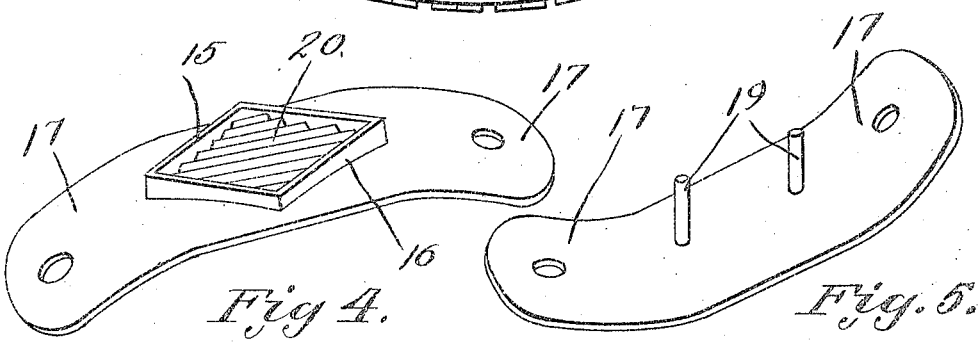

UNITED STATES PATENT OFFICE.

FRANK LODER, OF LA FAYETTE, INDIANA.

RESILIENT PNEUMATIC TIRE.

1,153,396.   Specification of Letters Patent.   Patented Sept. 14, 1915.

Application filed May 29, 1914. Serial No. 841,832.

*To all whom it may concern:*

Be it known that I, FRANK LODER, a citizen of the United States, residing at La Fayette, in the county of Tippecanoe and State of Indiana, have invented a new and useful Resilient Pneumatic Tire; and I do hereby declare the following to be a full, clear, and exact description of the invention, such as will enable others skilled in the art to which it appertains to make and use the same.

This invention relates to the art of resilient pneumatic tires and more specifically to a particular form of outer casing comprising an inner casing of the composition of cotton and asbestos having a leather covering extending partially about the same, and provided with a tread surface consisting of a plurality of layers of such materials as fabric, mineral wool, asbestos, and leather. Said tread surface is provided with non-skidding members secured between the outer layers of the tread surface.

In practical fields the details of construction may be subjected to alterations, falling within the scope of what is claimed.

The invention comprises further features and combination of parts, as hereinafter set forth, shown in the drawings and claimed.

Figure 2:
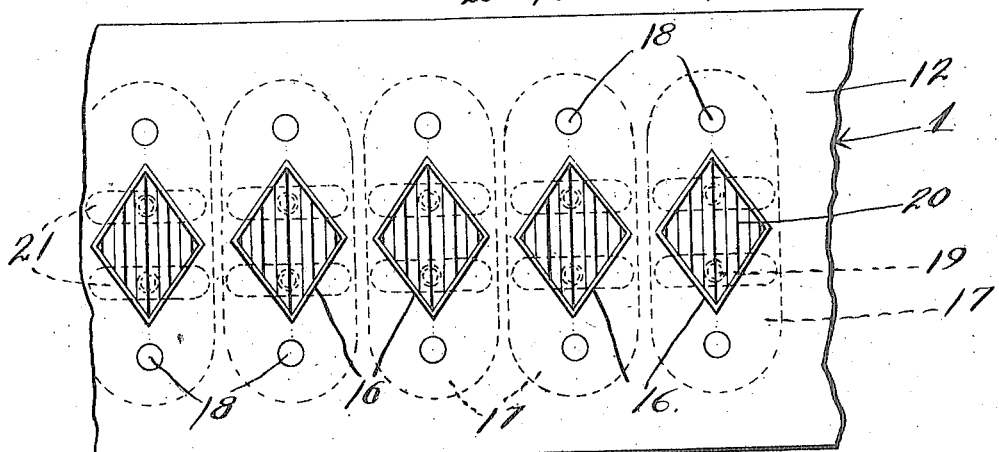

In the drawings:—Figure 1 is a sectional view through the improved resilient pneumatic tire constructed in accordance with the invention. Fig. 2 is a plan view of a section of the tire, showing the tread thereof and the non-skidding members. Fig. 3 is a view in side elevation of the tire construction on a wheel rim, showing parts of the tire broken away and in section, so as to illustrate the vital parts of construction on the interior of the tire. Fig. 4 is a detail view in perspective of one of the steel suction non-skidding members. Fig. 5 is another view of the member showing the opposite surface thereof to that shown in Fig. 4.

Referring more particularly to the drawings, 1 designates the casing of the tire as a whole having a casing of any suitable material, such as a composition of cotton as shown. This casing 2 is provided with a suitable outside leather covering 3. The casing terminates in adjacent enlargements 4 having bores or hollow portions 5. These enlargements are designed to engage the usual clencher flanges of the wheel rim, as shown at 6. The composition cotton casing 2 is provided with particles of asbestos 7.

Extending partially about the casing, that is, as shown in cross section is a layer of fabric, or a composition thereof and mineral wool 8, and over this layer is a layer of asbestos 9, which terminates at portions of the casing as indicated at 10. Over the layer of the asbestos lining 9 is another layer of mineral wool 11, and adjacent this surface or lining is a leather covering 12, which merges into the leather covering 3, as indicated at 13. The leather covering 12 is provided with a series of openings 14, through which the flanges 15 of the steel non-skidding members 16 extend. The parts 17 or plates from which the non-skidding members project are embedded between the leather covering 12 and the mineral wool layer, as shown, and are riveted to the leather covering 12 by the flat rivets 18. Rivets 19 also extend through the non-skidding members and through the asbestos layer 9, thereby further securing the non-skidding members in place. The flanges 15 of the non-skidding members are formed substantially of a diamond-shaped contour, and extending transversely of the non-skidding members are corrugations 20. The riveted ends of the rivets 19 have elongated plates 21, upon the inner face of the asbestos lining or layer 9.

Arranged annularly of an inner lining 22 (which is disposed adjacent the composition cotton casing) of any suitable material, is a multiplicity of pneumatic tubes 23, some of which are constructed of a composition of cotton and asbestos fabric, in such wise as to provide tubes of airproof character. Arranged between the tubes 23 and the innermost lining 22 is a light asbestos packing 24. It is to be remembered that the elasticity of the tube 23 is to be substantially the same as the usual pneumatic rubber tube, and yet of such character as to hold a larger and higher pressure of air, thereby enabling the tube to have more stability and firmness. The tubes 23 may be either continuous, as shown in Fig. 3 having a division wall 26 and provided with an inflating check valve 27, or provided with two ends arranged adjacent each other as shown at 28 in Fig. 3, one end having an inflating check valve, and upon first inflating the tire the tubes 23 are first inflated, subsequently to which the key tube 29 is inflated, thereby causing the tubes 23 to crowd and compact closely together, but not too much to prevent proper elasticity or resiliency of the tire, yet sufficient to render the tire stable and mobile. This innermost or key tube 29 may be either continuous, or provided with two ends, in the manner similar to the tubes 23 and supplied with the usual inflating check valve extension tube 30. Also, the innermost or key tube 29 may be constructed of a composition of cotton and asbestos fabric, or a composition of rubber, cotton and asbestos fabric, or of pure rubber, or leather as the case may require.

The tubes 23 are protected against puncturing owing to the improved construction of the tread of the outer casing, which tread, as before stated, includes several layers of different materials as hereinbefore stated. The tubes are further protected, as well as the tread, against puncturing, owing to the provision of multiplicity of suction non-skidding members, which tend to hold the tread proper from contact with the surface with which the tire is designed to engage.

From the foregoing it will be observed there has been devised a very efficient, simple and cheap construction of automobile wheel tires, and one which has been found exceedingly practical.

The invention having been set forth, what is claimed as new and useful is:—

1. Improvements in an outer casing for a pneumatic tire comprising an inner casing of a composition of cotton and asbestos, a leather covering extending about the inner casing and terminating a little beyond the center of the casing on each side, a tread surface therefor consisting of a composition of fabric and mineral wool and extending almost to the center of the casing on each side thereof, a layer of asbestos covering the composition of fabric and mineral wool and terminating substantially adjacent the center of the casing on each side, a second layer of fabric and mineral wool adjacent the asbestos layer and terminating at substantially the center of the casing on each side thereof, a second layer of leather adjacent the second layer of fabric and mineral wool and terminating adjacent the center of the casing on each side and merging into the first leather layer, thereby entirely inclosing the interior structure of the tread surface, said second leather layer having openings therein to receive protecting non-skidding members which are riveted to the asbestos layer and the second layer of fabric and mineral wool.

2. Improvements in an outer casing for a pneumatic tire comprising an inner casing of a composition of cotton and asbestos, a leather covering extending about the inner casing and terminating a little beyond the center of the casing on each side, a tread surface therefor consisting of a composition of fabric and mineral wool and extending almost to the center of the casing on each side thereof, a layer of asbestos covering the composition of fabric and mineral wool and terminating substantially adjacent the center of the casing on each side, a second layer of fabric and mineral wool adjacent the asbestos layer and terminating at substantially the center of the casing on each side thereof, a second layer of leather adjacent the second layer of fabric and mineral wool and terminating adjacent the center of the casing on each side and merging into the first leather layer, thereby entirely inclosing the interior structure of the tread surface, non-skidding members interposed between the second leather layer and the second fabric and mineral wool layer and protruding through the second leather layer, and means for riveting the non-skidding members to the asbestos layer and the second fabric layer.

In testimony whereof I have signed my name to this specification in the presence of two subscribing witnesses.

FRANK LODER.

Witnesses:
JAMES L. CALDWELL,
FLOYD A. STERRETT.